(12) United States Patent
Inoue et al.

(10) Patent No.: US 6,653,023 B1
(45) Date of Patent: Nov. 25, 2003

(54) RECTANGULAR BATTERY

(75) Inventors: Masao Inoue, Tokushima (JP); Takeo Hamamatsu, Tokushima (JP); Takashi Nagase, Matsushige (JP); Hideyuki Asanuma, Matsushige (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/534,174

(22) Filed: Mar. 24, 2000

(30) Foreign Application Priority Data

Mar. 25, 1999 (JP) ......................................... P. 11-081276

(51) Int. Cl.[7] ........................ H01M 4/02; H01M 10/26; H01M 6/04; H01M 2/28
(52) U.S. Cl. ........................ 429/429; 429/209; 429/206; 429/161; 29/623.5
(58) Field of Search ........................ 429/209, 206–208, 429/233, 101, 161; 29/623.1–623.5, 730

(56) References Cited

U.S. PATENT DOCUMENTS

| | | | | |
|---|---|---|---|---|
| 3,607,430 A | * | 9/1971 | Glover ........................ | 429/161 |
| 3,844,841 A | * | 10/1974 | Baker ........................ | 429/155 |
| 3,846,879 A | * | 11/1974 | Jenkins ........................ | 180/270 |
| 3,871,921 A | * | 3/1975 | Beatty et al. ................ | 136/111 |
| 3,897,266 A | * | 7/1975 | Devitt et al. ................ | 429/155 |
| 4,113,921 A | * | 9/1978 | Goldstein et al. ............. | 429/27 |
| 4,159,367 A | * | 6/1979 | Berchielli et al. ........... | 429/101 |
| 4,211,833 A | * | 7/1980 | Einstein ........................ | 429/149 |
| 4,276,361 A | * | 6/1981 | Boudrot et al. .............. | 429/186 |
| 4,350,608 A | * | 9/1982 | Gestaut ........................ | 429/211 |
| 4,407,909 A | * | 10/1983 | Goebel ........................ | 429/50 |
| 4,883,728 A | * | 11/1989 | Witehira ........................ | 180/270 |
| 4,977,043 A | * | 12/1990 | Kadouchi et al. ........... | 429/101 |
| 4,988,585 A | * | 1/1991 | O'Hara et al. ................ | 429/66 |
| 5,045,415 A | * | 9/1991 | Witehira ........................ | 429/209 |
| 5,141,523 A | * | 8/1992 | Catotti et al. ................ | 180/270 |
| 5,158,842 A | * | 10/1992 | McHenry ........................ | 429/161 |
| 5,169,735 A | * | 12/1992 | Witehira ........................ | 180/270 |
| 5,419,982 A | * | 5/1995 | Tura et al. ................... | 429/101 |
| 5,518,836 A | * | 5/1996 | McCullough ............ | 423/447.2 |
| 5,582,936 A | * | 12/1996 | Mrotek et al. ............... | 429/211 |
| 5,693,105 A | * | 12/1997 | Kawakami ................ | 29/623.2 |
| 5,746,781 A | * | 5/1998 | Velasquez et al. ......... | 29/623.5 |
| 5,800,939 A | * | 9/1998 | Mishina et al. ............... | 429/57 |
| 5,865,874 A | * | 2/1999 | Trainer ........................ | 75/362 |
| 5,894,656 A | * | 4/1999 | Menon et al. ............... | 429/101 |
| 5,981,108 A | * | 11/1999 | Matsumura et al. ....... | 29/623.5 |
| 6,001,139 A | * | 12/1999 | Asanuma et al. ......... | 423/447.2 |
| 6,025,095 A | * | 2/2000 | Kawamura ................. | 429/161 |
| 6,103,424 A | * | 8/2000 | Hamamatsu et al. ........ | 429/161 |
| 6,187,472 B1 | * | 2/2001 | Shiota et al. ............... | 429/127 |
| 6,296,961 B1 | * | 10/2001 | Moy et al. ................. | 29/623.5 |
| 6,346,343 B1 | * | 2/2002 | Notten et al. ............... | 429/101 |
| 6,371,997 B1 | * | 4/2002 | Chang et al. ............... | 180/270 |
| 6,388,866 B1 | * | 5/2002 | Rorvick et al. ............. | 429/186 |

FOREIGN PATENT DOCUMENTS

| | | | |
|---|---|---|---|
| CN | 1076313 A | 9/1993 | |
| CN | 1193197 A | 9/1998 | |
| EP | 0 602 976 | 6/1994 | |
| EP | 0 869 570 | 10/1998 | |
| JP | 8-22816 A | * 1/1996 | |
| JP | 8-22816 | * 1/1996 | .................. 429/209 |
| JP | 10-154256 | * 6/1998 | .................. 429/209 |
| JP | 10-154526 | 6/1998 | |

* cited by examiner

*Primary Examiner*—Tom Dunn
*Assistant Examiner*—L. Edmondson
(74) *Attorney, Agent, or Firm*—Nixon & Vanderhye P.C.

(57) ABSTRACT

A rectangular alkaline storage battery includes an electrode plate which can be easily prepared and has a high packing density of active material and volumetric energy density. A connected negative electrode plate with hydrogen-absorbing alloy negative electrode plates is bent into a U-shaped form at a central portion (connecting portion). A composite positive electrode plate is then sandwiched by the hydrogen-absorbing alloy negative electrode plates with a separator made of an unwoven polypropylene fabric provided interposed therebetween to prepare an electrode plate unit. Two such electrode plate units are then laminated to form a group of electrode plates.

12 Claims, 4 Drawing Sheets

RECTANGULAR BATTERY

BACKGROUND OF THE INVENTION

1. Field of the Invention

The present invention relates to a rectangular battery, especially rectangular battery comprising a group of electrode plates having a positive electrode plate and a negative electrode plate laminated on each other with a separator provided interposed therebetween such as nickel-hydrogen storage battery and nickel-cadmium storage battery.

2. Description of the Related Art

In recent years, a rectangular alkaline storage battery has been developed to enhance the volumetric efficiency of the interior of the apparatus using battery as a substitute for cylindrical alkaline storage battery comprising a coiled group of electrodes formed by spirally winding a positive electrode plate and a negative electrode plate with a separator provided interposed therebetween. This type of a rectangular alkaline storage battery is prepared by a process which comprises inserting into a rectangular can a group of electrode plates having a positive electrode plate and a negative electrode plate alternately laminated on each other with a separator provided interposed therebetween, connecting a positive electrode lead extending from the positive electrode plate and a negative electrode lead extending from the negative electrode plate to the positive electrode terminal and the negative electrode terminal, respectively, injecting an electrolytic solution into the can, and then sealing the can at the opening portion with a sealing material.

This type of a rectangular alkaline storage battery has found rapidly growing demand as a power supply for portable apparatus such as portable telephone and notebook type personal computer. As a result, the rectangular alkaline storage battery has been required to have a higher capacity and a prolonged life. To this end, this type of a rectangular alkaline storage battery is prepared, e.g., by a process which comprises forming a pair of horizontally arranged negative electrode plates having a belt-like core material in common with each other, bending the central portion (connection portion) of the pair of negative electrode plates into a U-shape, sandwiching a positive electrode plate by the two negative electrode plates connected to each other through a U-shaped bent with a separator provided interposed therebetween to form an electrode plate unit, laminating a positive electrode plate between the electrode plate units with a separator provided interposed therebetween to form a group of electrode plates, and then inserting the group of electrode plates into a rectangular can with an electrolytic solution.

When the thickness of the separator, which doesn't take part in the charge-discharge reaction of the battery, is reduced to further enhance the energy density of the foregoing rectangular alkaline storage battery, the packed amount of the active material can be increased by the amount corresponding to the reduction in the thickness of the separator, making it possible to obtain a high energy density and capacity battery.

However, the smaller the thickness of the separator is for higher energy density and capacity, the lower is the mechanical strength of the separator and the more likely is internal short-circuiting. Thus, the reduction of the thickness of the separator is limited.

When a rectangular alkaline storage battery is prepared by sandwiching a positive electrode plate 10D by a pair of negative electrode plates 24, 25 connected to each other through a central U-shaped bent portion (connecting portion) 23 with a separator 30 provided interposed therebetween to form an electrode plate unit, laminating a positive electrode plate 10D between a pair of the electrode plate units with a separator 30 provided interposed therebetween to form a group of electrode plates, and then inserting the group of electrode plates into a rectangular can with an electrolytic solution as shown in FIG. 7, six sheets of the separator 30 are required.

When the number of sheets of separators disposed inside the battery is reduced instead of reducing the thickness of the separator to increase the thickness of the electrode plate by the amount corresponding to the reduction of the thickness of the separator and hence increase the packed amount of the active material, e.g., when a rectangular alkaline storage battery is prepared by a process which comprises sandwiching a positive electrode plate 10E having a great thickness by a pair of negative electrode plates 26, 27 connected to each other through a central U-shaped bent portion (connecting portion) 23 to form an electrode plate unit, laminating two such electrode plate units to form a group of electrode plates, and then inserting the group of electrode plates into a rectangular can with an electrolytic solution as shown in FIG. 8, only four sheets of the separator are required.

Thus, when the number of sheets of separators disposed inside the battery is reduced instead of reducing the thickness of the separator, the thickness of the electrode plate can be increased by the amount corresponding to the reduction of the number of sheets of separators, making it possible to increase the packed amount of the active material. Thus, a high energy density and capacity battery can be obtained.

However, the foregoing approach is disadvantageous in that it is difficult to prepare an electrode plate having a great thickness by packing an active material at a high density. The foregoing approach is also disadvantageous in that when an electrode plate comprising as a core material a three-dimensionally network porous substrate (e.g., expanded (forming) nickel) is prepared, it is difficult to increase the thickness of the electrode plate itself.

SUMMARY OF THE INVENTION

In the light of the foregoing disadvantages, the present invention has been worked out to provide a rectangular battery such as a rectangular alkaline storage battery comprising an electrode plate which can be easily prepared and having a high packing density of active material and volumetric energy density.

In order to solve the foregoing problems, the rectangular alkaline storage battery of the invention comprises as an electrode plate unit a group of electrode plates having a pair of one electrode plates (e.g., negative electrode plate) and a composite electrode plate made of a plurality of the other electrode plates (e.g., positive electrode plate) sandwiched by the pair of one electrode plates with a separator provided interposed therebetween. There is provided one such an electrode plate unit or a laminate of a plurality of such electrode plate units. In this arrangement of group of electrode plates, there is no need to dispose a separator between the electrode plate units, making it possible to reduce the number of sheets of separators to be disposed in the group of electrode plates.

By reducing the number of sheets of separators to be disposed in the group of electrode plates, the thickness of one electrode plate and the other electrode plate can be increased by the amount corresponding to the reduction in the number of sheets of separators. By increasing the number of sheets of electrode plates instead of increasing the thickness of the electrode plates, the thickness per sheet of electrode plate can be reduced. As a result, the active material can be packed at a high density. At the same time, a three-dimensional network porous substrate (e.g., expanded nickel) can be used as an electrode core material. Accordingly, the volumetric energy density of the electrode plate can be enhanced, making it possible to obtain a high capacity rectangular alkaline storage battery.

Further, when at least one collector lead plate is fixed to the composite electrode plate extending therefrom, and the collector lead plate is disposed in such an arrangement that it doesn't come in contact with the separator at the fixing point thereof, short-circuiting due to piercing through separator by burr developed during the formation of collector lead plate can be prevented. Moreover, when such a collector lead plate is provided on the various electrode plates constituting the composite electrode plate in such an arrangement that the collector lead plates face each other at the welded portion thereof so that the electrode plate comes in contact with the separator, short-circuiting due to piercing through separator can be prevented.

Further, when one collector lead plate is fixed between the various electrode plates constituting the composite electrode plate, and an arrangement is made such that electricity is collected from the various electrode plates through the collector lead plate, short-circuiting due to piercing through separator can be prevented because the collector lead plate is disposed in such an arrangement that it doesn't come in contact with the separator at the fixing point thereof. At the same time, the number of collector lead plates can be reduced.

Further, the pair of one electrode plates are connected to each other through a connecting portion made of the core material of these electrode plates and integrally formed therewith. When the connecting portion is bent in almost U-shaped form, a composite electrode plate can be merely disposed between the pair of one electrode plates connected to each other through the U-shaped bent connecting portion with a separator provided interposed therebetween to form an electrode plate unit easily. Thus, this type of a group of electrode plates can be easily formed.

A first aspect of the battery is a rectangular battery comprising a positive electrode, a negative electrode and a separator interposed therebetween, wherein at least one of the positive electrode and the negative electrode has a composite electrode plate made of a plurality of the other electrode plates.

A second aspect of the battery is a rectangular battery which comprises a group of electrode plates having one electrode plate and the other electrode plate laminated on each other with a separator provided interposed therebetween, wherein said group of electrodes comprises a laminate of a plurality of electrode plate units each having a composite electrode plate made of a plurality of the other electrode plates sandwiched by a pair of said one electrode plates with said separator provided interposed therebetween.

A third aspect of the battery is a rectangular battery according to the first aspect, wherein said rectangular battery is a rectangular alkaline storage battery.

A fourth aspect of the battery is a rectangular battery according to the first aspect, wherein at least one collector lead plate is bonded to said composite electrode plate extending therefrom and said collector lead plate is disposed in such an arrangement that it doesn't come in contact with said separator at the bonded portion thereof.

A fifth aspect of the battery is a rectangular battery according to the first aspect, wherein a collector lead plate is fixed between the electrode plates constituting said composite electrode plate and electric charge is collected from the electrode plates constituting said composite electrode plate through said collector lead plate.

A sixth aspect of the battery is a rectangular battery according to the first aspect, wherein the composite electrode plate is constituted by bonding the juxtaposed electrode plates through the collector lead plate sandwiched between one ends of the electrode plates and the bonded surfaces of the electrode plates are electrode plate core surfaces exposed of active material, and electrode plates are bonded by bonding the electrode plate core surfaces to the collector lead plate.

A seventh aspect of the battery is a rectangular battery according to the first aspect, wherein said one electrode plates are connected to each other through a connecting portion made of the core constituting said electrode plates and integrally formed with said electrode plates and said connecting portion is bent in almost U-shaped form so that said composite electrode plate is sandwiched by said one electrode plates connected to each other through said almost U-shaped connecting portion.

An eighth aspect of the battery is a rectangular battery according to the first aspect, wherein at least anyone of said electrode plates comprises a core material comprising a metal porous material and an active material packed in said electrode plate.

A ninth aspect of the battery is a rectangular battery according to the sixth aspect, wherein the core material is made of expanded nickel, having a three-dimensionally continuous space was packed with the active material slurry comprising nickel hydroxide as a main component.

A tenth aspect of the battery is a rectangular battery according to the first aspect, wherein said composite electrode plate constitutes a positive electrode.

An eleventh aspect of the battery is a rectangular battery according to the first aspect, wherein said one electrode plate is made of a core metal coated with an active material paste.

A twelfth aspect of the battery is a rectangular battery according to the seventh aspect, wherein said one electrode plate is made of a core metal of punching metal, both side surfaces of which are coated with an active material paste except for said U-shaped connecting portion.

A thirteenth aspect of the battery is a rectangular battery according to the seventh aspect, wherein said one electrode plate is made of a core metal made of metal mesh, both side surfaces of which are coated with an active material paste except for said U-shaped connecting portion.

A fourteenth aspect of the battery is a rectangular battery according to the seventh aspect, wherein a plurality of the groups of electrode plates are laminated in closed-end prismatic rectangular metal can in such an arrangement that the one electrode at the both ends of the groups of electrode, the inner surface of the metal can came in close contact with each other, said U-shaped connecting portion is in close contact with the inner bottom surface of the metal can, the composite electrode is connected with at lease one of the collector lead, and the metal can is filled with an electrolytic solution.

A fifteenth aspect of the battery is a rectangular battery according to the second aspect, wherein said one electrode plate is made of a composite electrode plate.

BRIEF DESCRIPTION OF THE DRAWINGS

FIG. 1 is a diagram illustrating the composite positive electrode plate according to the first example of the invention wherein FIG. 1(a) is a diagram illustrating two sheets of positive electrode plates overlapped on each other deviating from each other for explanation and FIG. 1(b) is diagram illustrating the side of the stack.

FIG. 2 is a diagram illustrating the composite positive electrode plate according to the second example of the present invention wherein FIG. 2(a) is a diagram illustrating two sheets of positive electrode plates overlapped on each other deviating from each other for explanation and FIG. 2(b) is diagram illustrating the side of the stack.

FIG. 3 is a diagram illustrating the modified composite positive electrode plate of the present invention wherein FIG. 3(a) is a diagram illustrating three sheets of positive electrode plates overlapped on each other deviating from each other for explanation and FIG. 3(b) is diagram illustrating the side of the stack.

PREFERRED EMBODIMENT OF THE INVENTION

An embodiment of implication of the present invention wherein the present invention is applied to nickel-hydrogen storage battery will be described in connection with the attached drawings.

Figure 1:
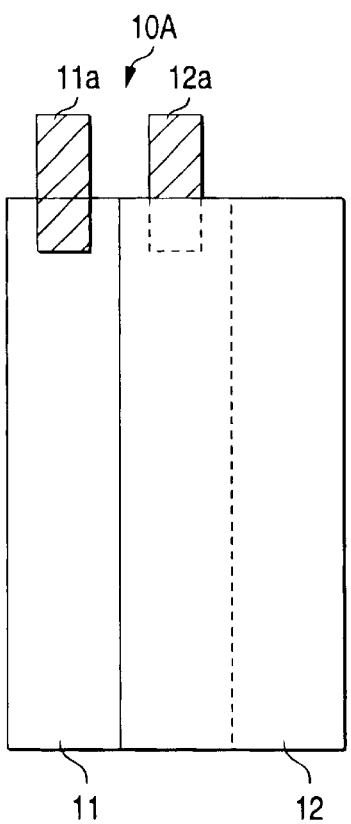
Figure 1:
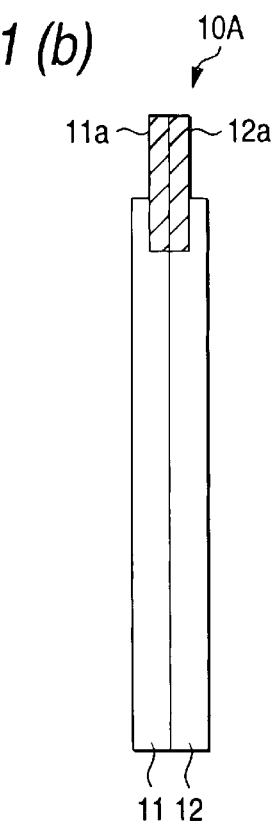
Figure 2:
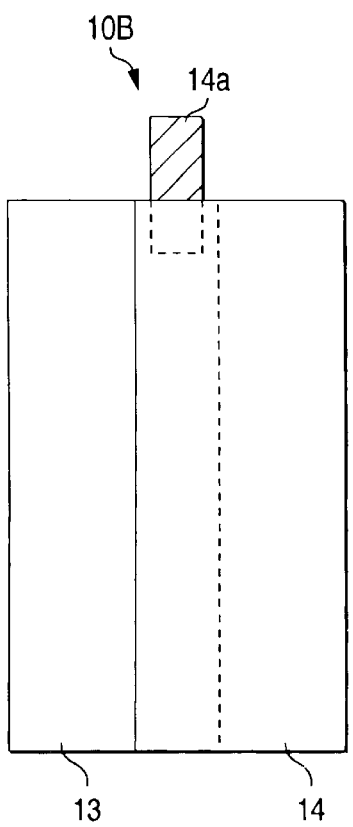
Figure 2:
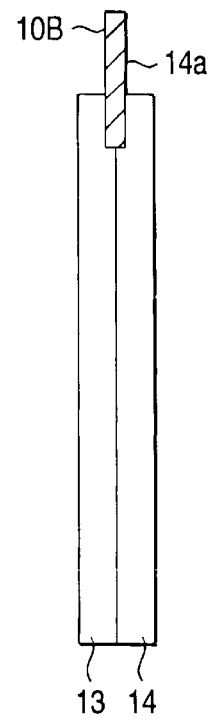
Figure 3:
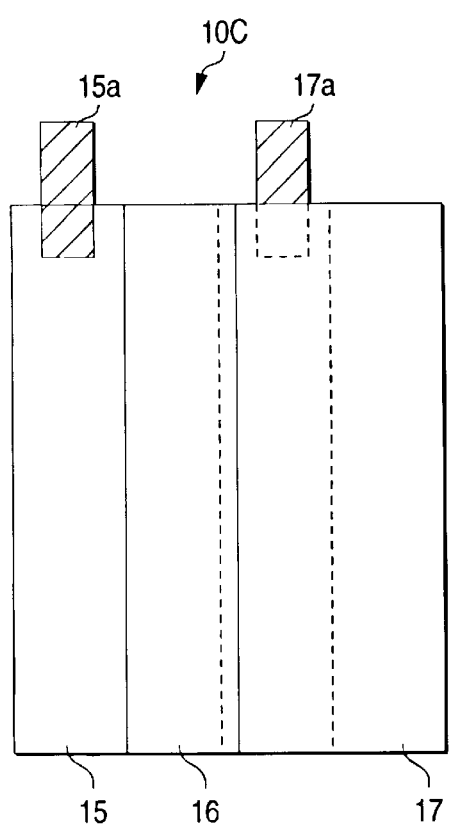
Figure 3:
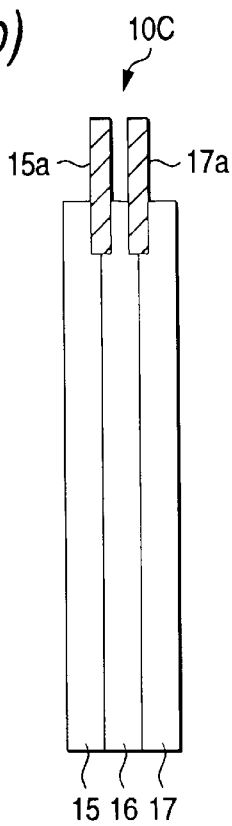
Figure 4:
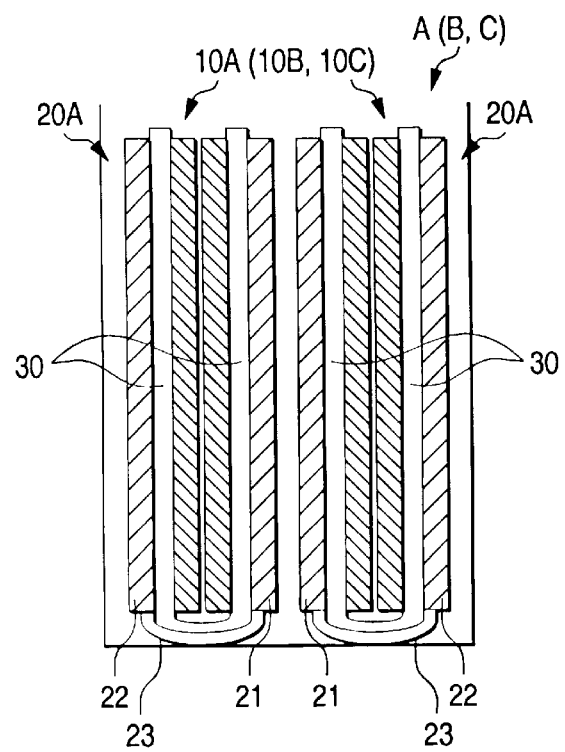
FIG. 4 is a sectional view illustrating the group of electrode plates according to the invention.
Figure 5:
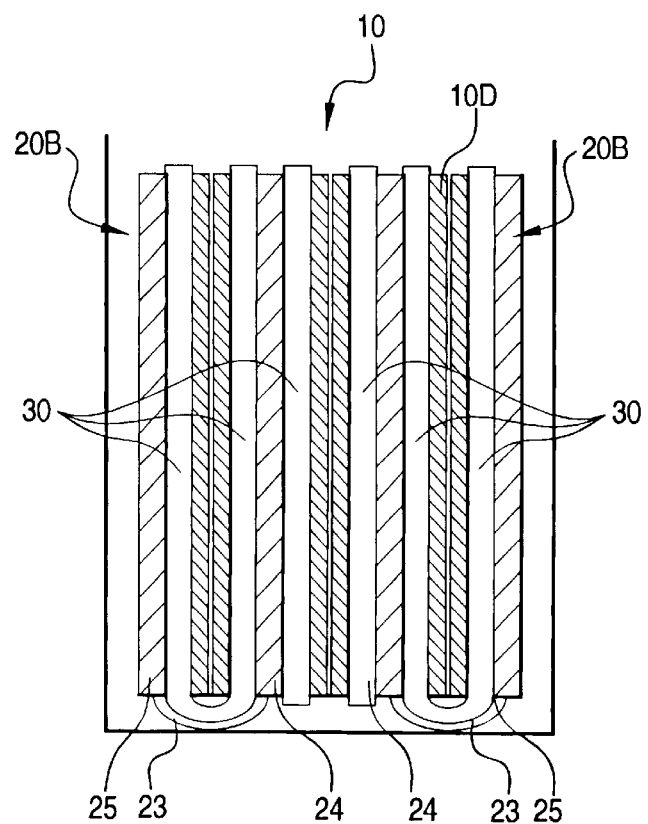
FIG. 5 is a sectional view illustrating the group of electrode plates according to the invention.
Figure 6:
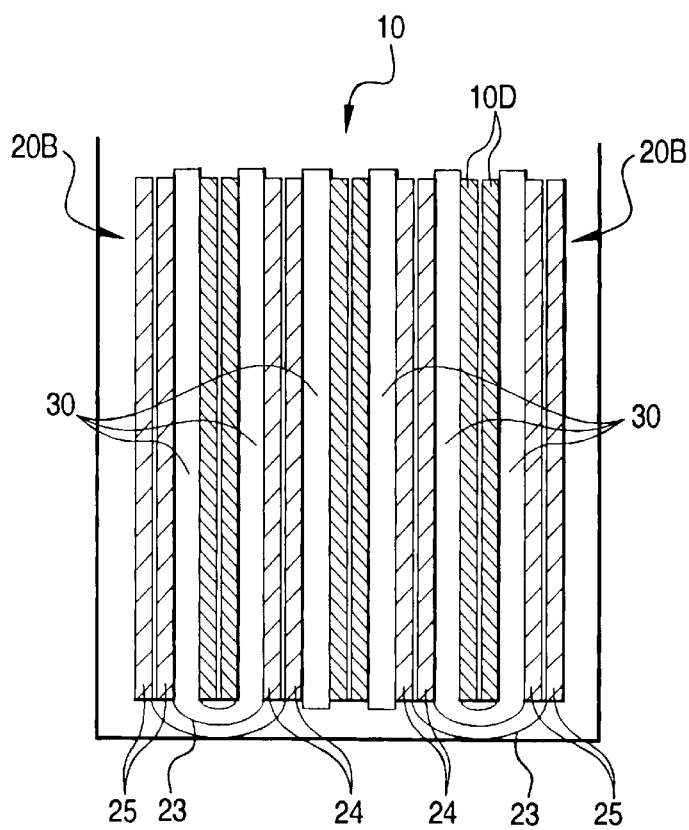
FIG. 6 is a sectional view illustrating the group of electrode plates according to the invention.
Figure 7:
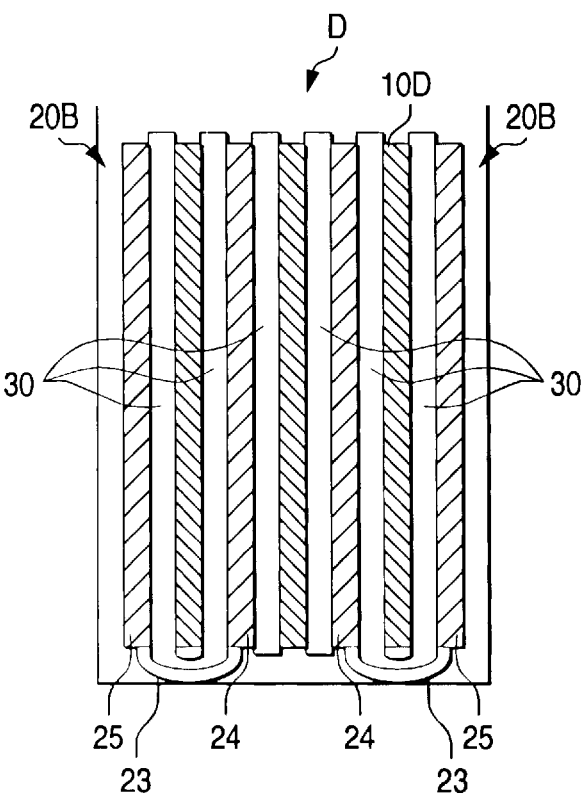
FIG. 7 is a diagram illustrating the group of electrode plates of a conventional example (first comparative example).
Figure 8:
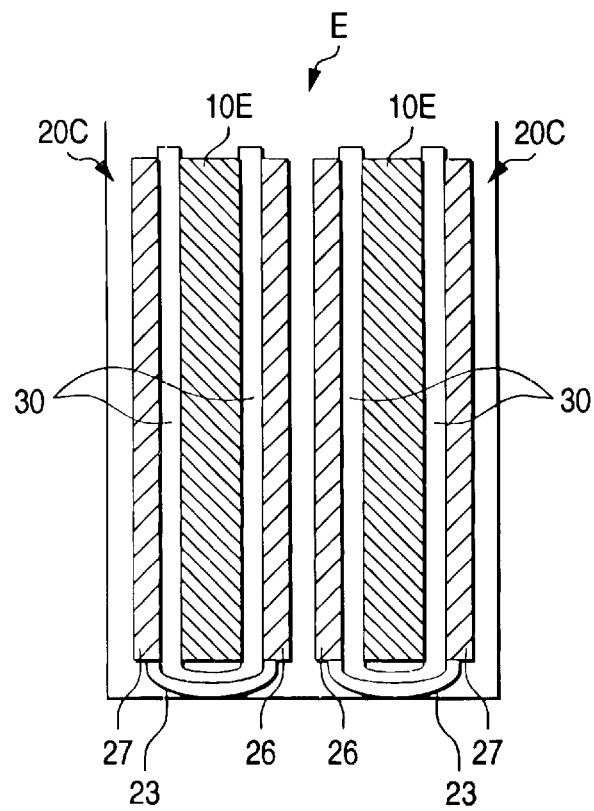
FIG. 8 is a diagram illustrating the group of electrode plates of another conventional example (second comparative example).

FIG. 1 is a diagram illustrating the composite electrode plate according to the first example of the invention wherein FIG. 1(a) is a diagram illustrating two sheets of positive electrode plates overlapped on each other deviating from each other and FIG. 1(b) is diagram illustrating the side of the stack. FIG. 2 is a diagram illustrating the composite electrode plate according to the second example of the present invention wherein FIG. 2(a) is a diagram illustrating two sheets of positive electrode plates overlapped on each other deviating from each other and FIG. 2(b) is diagram illustrating the side of the stack. FIG. 3 is a diagram illustrating the composite electrode plate according to the third example of the present invention wherein FIG. 3(a) is a diagram illustrating three sheets of positive electrode plates overlapped on each other deviating from each other and FIG. 3(b) is diagram illustrating the side of the stack. FIG. 4 is a sectional view illustrating the group of electrode plates of the various examples according to the invention. FIG. 5 is a diagram illustrating the group of electrode plates of the first comparative example. FIG. 6 is a diagram illustrating the group of electrode plates of the second comparative example.

1. Preparation of Composite Positive Electrode Plate (1) Example 1

A core material comprising a metal porous material (having a thickness of 1.2 mm for example) made of expanded nickel or the like having a three-dimensionally continuous space was packed with an active material slurry comprising nickel hydroxide as a main component, dried, and then rolled to a predetermined thickness (e.g., 0.63 mm) to prepare a first nickel positive electrode plate 11 and a second nickel positive electrode plate 12.

Subsequently, the active material which had been packed in the upper end of the first nickel positive electrode plate 11 and the second nickel positive electrode plate 12 was partly removed to form the respective active material release portions. A first collector lead plate 11a or a second collector lead plate 12a was then welded to these release portions. Thereafter, as shown in FIG. 1 (wherein FIG. 1(a) is a front view illustrating the two electrode plates overlapped on each other deviating from each other for being able to understand easily (completely overlapped on each other when completed), and FIG. 1(b) is a side view of the stack), the first nickel positive electrode plate 11 and the second nickel positive electrode plate 12 were laminated on each other in such an arrangement that the first collector lead plate 11a and the second collector lead plate 12a are disposed opposite to each other to prepare a composite positive electrode plate 10A of Example 1.

As the active material slurry comprising nickel hydroxide as a main component there was used one obtained by a process which comprises adding a 0.2 wt-% aqueous solution of hydroxypropyl cellulose to a mixture of 10 parts by weight of a nickel hydroxide powder containing 2.5% by weight of zinc and 1% by weight of cobalt as coprecipitating components, and then stirring the mixture. As the active material slurry comprising nickel hydroxide as a main component there was used the same material hereinafter.

(2) Example 2

A core material comprising a metal porous material (having a thickness of 1.2 mm for example) made of expanded nickel or the like having a three dimensionally continuous space was packed with the active material slurry comprising nickel hydroxide as a main component, dried, and then rolled to a predetermined thickness (e.g., 0.63 mm) to prepare a first nickel positive electrode plate 13 and a second nickel positive electrode plate 14.

Subsequently, the active material which had been packed in the upper end of the second nickel positive electrode plate 14 was partly removed to form an active material release portion. A collector lead plate 14a was then welded to the release portion. Thereafter, as shown in FIG. 2 (wherein FIG. 2(a) is a front view illustrating the two electrode plates overlapped on each other deviating from each other for being able to understand easily (completely overlapped on each other when completed), and FIG. 2(b) is a side view of the stack), the second nickel positive electrode plate 14 was laminated on the first nickel positive electrode plate 13 in such an arrangement that the second collector lead plate 14 is disposed opposite to the first collector lead plate 13a to prepare a composite positive electrode plate 10B of Example 2.

(4) Comparative Example 1

A core material comprising a metal porous material (having a thickness of 1.5 mm for example) made of expanded nickel or the like having a three dimensionally continuous space was packed with the active material slurry comprising nickel hydroxide as a main component, dried, and then rolled to a predetermined thickness (e.g., 0.83 mm) to prepare a nickel positive electrode plate. Subsequently, the active material which had been packed in the upper end of the nickel positive electrode plate was partly removed to form an active material release portion. A collector lead plate was then welded to the release portion to prepare a composite positive electrode plate 10D of Comparative Example 1.

A core material comprising a metal porous material (having a thickness of 2.2 mm for example) made of expanded nickel or the like having a three-dimensionally continuous space was packed with the active material slurry comprising nickel hydroxide as a main component, dried, and then rolled to a predetermined thickness (e.g., 1.29 mm) to prepare a nickel positive electrode plate. Subsequently, the active material which had been packed in the upper end of the nickel positive electrode plate was partly removed to form an active material release portion. A collector lead plate was then welded to the release portion to prepare a composite positive electrode plate 10E of Comparative Example 2.

2. Preparation of Connecting Negative Electrode Plate

To a hydrogen-absorbing alloy powder comprising a Ti-Ni-based or La (or Mm)-Ni-based polyalloy such as $MmNi_{3.4}Co_{0.8}Al_{0.9}Mn_{0.6}$ alloy was added a polytetrafluoroethylene (PTFE) powder as a binder in an amount of 5% by weight. The mixture was then kneaded to prepare a negative electrode active material paste. The negative electrode active material paste thus prepared was then applied to a metal core material made of a punching metal or the like at two parts apart from each other in such a manner that the central portion (connecting portion) 23 was exposed. The coated material was then pressed from both upper and lower sides thereof to prepare a connected negative electrode plate 20A (20B, 20C) having two hydrogen-absorbing alloy negative electrode plates 21, 22 (24, 25 or 26, 27) connected to each other through the central portion (connecting portion) 23.

Various negative electrode active material pastes were prepared in such a manner that the capacity ratio of the positive electrode plates and the negative electrode plates prepared in the foregoing examples and comparative examples were the same.

3. Preparation of Group of Electrodes (1) Examples 1–2

The connected negative electrode plate 20A comprising the two hydrogen-absorbing alloy negative electrode plates 21, 22 thus prepared was bent into a U-shaped form at the central portion (connecting portion) 23. The various composite positive electrode plates 10A and 10B prepared as previously mentioned were then each sandwiched by the hydrogen-absorbing alloy negative electrode plates 21, 22 with a separator 30 made of an unwoven polypropylene fabric having a thickness of 0.15 mm to prepare an electrode plate unit. Two such electrode plate units were thus prepared (as shown in FIG. 4). The two electrode plate units were then laminated to prepare groups of electrode plates of Examples 1 and 2. The group of electrode plates comprising the composite positive electrode plate 10A of Example 1 will be hereinafter referred to as "group of electrode plates A of Example 1"). The group of electrode plates comprising the composite positive electrode plate 10G of Example 2 will be hereinafter referred to as "group of electrode plates B of Example 2").

(2) Comparative Example 1

The connected negative electrode plate 20B comprising the two hydrogen-absorbing alloy negative electrode plates 24, 25 thus prepared was bent into a U-shaped form at the central portion (connecting portion) 23. The composite positive electrode plate 10D prepared as previously mentioned was then sandwiched by the hydrogen-absorbing alloy negative electrode plates 24, 25 with a separator 30 made of an unwoven polypropylene fabric having a thickness of 0.15 mm to prepare an electrode plate unit. Two such electrode plate units were thus prepared. The two electrode plate units were then laminated to prepare a group of electrode plates D of Comparative Example 1.

(3) Comparative Example 2

The connected negative electrode plate 20C comprising the two hydrogen-absorbing alloy negative electrode plates 26, 27 thus prepared was bent into a U-shaped form at the central portion (connecting portion) 23. The composite positive electrode plate 10E prepared as previously mentioned was then sandwiched by the hydrogen-absorbing alloy negative electrode plates 26, 27 with a separator 30 made of an unwoven polypropylene fabric having a thickness of 0.15 mm to prepare an electrode plate unit. Two such electrode plate units were thus prepared. The two electrode plate units were then laminated to prepare a group of electrode plates E of Comparative Example 2.

The composite positive electrode plates 10A and 10B of the group of electrode plates of Examples 1 and 2, respectively, and the positive electrode plates 10D and 10E of Comparative Examples 1 and 2, respectively, were then measured for the thickness of electrode plate, the positive electrode active material density, the weight of positive electrode active material and the weight of negative electrode active material. The results are set forth in Table 1.

TABLE 1

| Group of electrode plates | Thickness of positive electrode | Positive electrode active material density | Weight of positive electrode active material | Weight of negative electrode active material |
| --- | --- | --- | --- | --- |
| A | 76 | 108 | 106 | 106 |
| B | 76 | 108 | 106 | 106 |
| D | 100 | 100 | 100 | 100 |
| E | 155 | 97 | 102 | 102 |

In Table 1 above, calculation is made relative to the thickness of the thickness, positive electrode active material density and weight of positive electrode active material of the positive electrode plate 10D of the group of electrode plates D of Comparative Example 1 and the weight of negative electrode active material of the hydrogen-absorbing alloy negative electrode plates 24, 25 of the connected negative electrode plate 20B as 100. For the thickness of the composite positive electrode plates 10A, 10B, the thickness of the positive nickel plates 11 (12) and 13 (14) were each determined.

As can be seen in Table 1 above, the composite positive electrode plates 10A, 10B of Examples 1 and 2, respectively, can be provided with a reduced thickness and hence a raised density.

4. Preparation of Rectangular Alkaline Storage Battery

The groups of electrode plates A, B, D and E thus prepared were each inserted in closed-end prismatic (rectangular) metal can in such an arrangement that the hydrogen-absorbing alloy negative electrode plate 22 (25 or 27) at the both ends of the groups of electrode plates A, B, D and E and the inner surface of the metal can came in close contact with each other and the central portion (connecting portion) 23 the metal core of which had been exposed came in close contact with the inner bottom surface of the metal can. Subsequently, These metal cans were each filled with an electrolytic solution comprising a 30 wt-% aqueous solution of potassium hydroxide (KOH) to prepare rectangular alkaline storage batteries A, B, D and E having a BI size (width: 17.0 mm; height: 48.0 mm; thickness: 6.1 mm).

The rectangular alkaline storage battery comprising the group of electrode plates A of Example 1 will be hereinafter referred to as "battery A of Example 1"). The rectangular alkaline storage battery comprising the group of electrode plates B of Example 2 will be hereinafter referred to as "battery B of Example 1"). The rectangular alkaline storage battery comprising the group of electrode plates D of Comparative Example 1 will be hereinafter referred to as "battery D of Comparative Example 1"). The rectangular alkaline storage battery comprising the group of electrode plates E of Comparative Example 2 will be hereinafter referred to as "battery E of Comparative Example 1").

5. Discharge Capacity Test

The batteries A, B, D and E thus prepared were each subjected to charging with charging current of 0.1 C (60 mA) for 16 hours followed by a 1-hour suspension. Thereafter, these batteries were each subjected to discharging with discharging current of 0.2 C (120 mA) until the end voltage reached 1.0 V, followed by a 1-hour suspension. This charge-discharge cycle was repeated five times at room temperature so that the rectangular alkaline storage batteries A, B, D and E were activated.

Subsequently, the rectangular alkaline storage batteries A, B, D and E thus activated were each subjected to charging with charging current of 0.1 C (60 mA) for 16 hours, followed by a 1-hour suspension. Thereafter, the discharge capacity was determined from the discharging time required until the end voltage reached 1.0 V when these batteries were each subjected to discharging with discharging current of 0.2 C (120 mA). The capacity ratio was then determined relative to the discharge capacity of the battery D of Comparative Example 1 as 100. The results are set forth in Table 2 below.

TABLE 2

| Type of battery | A | B | D | E |
| --- | --- | --- | --- | --- |
| Discharge capacity | 106 | 106 | 100 | 102 |

As can be seen in Table 2 above, the comparison of the battery D of Comparative Example 1 with the battery E of Comparative Example 2 shows that the battery E of Comparative Example 2 exhibits a greater discharge capacity. This is because when two electrode plate units each having a positive electrode plate 10E provided interposed between the hydrogen-absorbing alloy negative electrode plates 21, 22 of the connected negative electrode plate 20A are laminated to form a group of electrode plates instead of laminating a positive electrode plate 10D between two electrode plate units with a separator 30 provided interposed therebetween, the number of sheets of separators 30 can be reduced, making it possible to increase the thickness of the positive electrode plate 10E and the negative electrode plates 26, 27 by the amount corresponding to the reduction in the number of sheets of separators 30 and hence increase the discharge capacity.

Further, the comparison of the batteries A and B of Examples 1 and 2, respectively, and the battery E of Comparative Example 2 shows that the batteries A and B of Examples 1 and 2, respectively, exhibit a greater discharge capacity than the battery E of Comparative Example 2. This is because the batteries A and B of Examples 1 and 2, respectively, comprise the composite positive electrode plates 10A and 10B, respectively, to raise the packing density of active material in the various positive electrode plates 11, 12 (13, 14) and hence increase the amount of active material to be packed in the various positive electrode plates 11, 12 (13, 14), although the number of sheets of separators 30 used is the same.

6. Modifications

The foregoing examples have been described with reference to the case where two sheets of positive electrode plates are used to form a composite electrode plate. However, the number of sheets of electrode plates constituting the composite electrode plate of the invention is not limited to two. Three or four sheets of electrode plates may be laminated. A modification of the composite electrode plate of the invention will be described hereinafter in connection with FIG. 3 (wherein FIG. 3(a) is a diagram illustrating three sheets of positive electrode plates overlapped on each other deviating from each other (completely overlapped on each other when completed) and FIG. 3(b) is diagram illustrating the side of the stack.).

A core material comprising a metal porous material (having a thickness of 0.8 mm for example) made of expanded nickel or the like having a three-dimensionally continuous space was packed with an active material slurry comprising nickel hydroxide as a main component, dried, and then rolled to a predetermined thickness (e.g., 0.42 mm) to prepare a first nickel positive electrode plate 15, a second nickel positive electrode plate 16 and a third nickel positive electrode plate 17.

Subsequently, the active material which had been packed in the upper end of the first nickel positive electrode plate 15 and the third nickel positive electrode plate 17 was partly removed to form the respective active material release portions. A first collector lead plate 15a or a second collector lead plate 17a was then welded to these release portions. Thereafter, as shown in FIG. 3, the second nickel positive electrode plate 16 and the third nickel positive electrode plate 17 were laminated on the first nickel positive electrode plate 15 in such an arrangement that the first collector lead plate 15a of the first nickel positive electrode plate 15 and the second nickel positive electrode plate 16 are disposed opposite to each other and the second nickel positive electrode plate 16 and the second collector lead plate 17a of the third nickel positive electrode plate 17 are disposed opposite to each other, and then welded to each other to prepare a modified composite positive electrode plate 10C.

On the other hand, the connected negative electrode plate 20A comprising the two hydrogen-absorbing alloy negative electrode plates 21, 22 thus prepared was then bent into a U-shaped form at the central portion (connecting portion) 23 thereof. The composite positive electrode plate 10C prepared as previously mentioned was then sandwiched by the hydrogen—absorbing alloy negative electrode plates 21, 22 with a separator 30 made of a unwoven polypropylene fabric having a thickness of 0.15 mm provided interposed therebetween to prepare an electrode plate unit. Thus, two such electrode plate units were prepared. The two electrode plate units were then laminated to prepare a comparative group of electrode plates C.

The group of electrode plate C thus prepared was then inserted into a closed-end prismatic (rectangular) metal can in such an arrangement that the hydrogen-absorbing alloy negative electrode plate 22 at the both ends of the group of electrode plates C and the inner surface of the metal can came in close contact with each other and the central portion (connecting portion) 23 the metal core of which had been exposed came in close contact with the inner bottom surface of the metal can. Subsequently, the metal can was filled with an electrolytic solution comprising a 30 wt-% aqueous solution of potassium hydroxide (KOH) to prepare a rectangular alkaline storage battery C having a BI size (width: 17.0 mm; height: 48.0 mm; thickness: 6.1 mm).

7. Study of the Mounting Position of Collector Lead Plate

The relationship between the mounting position of the collector lead plate fixed to the composite positive electrode plate extending therefrom and the occurrence of short-circuiting was then studied. Besides the foregoing batteries A and B of Examples 1 and 2, respectively, and the modified battery C, a battery F of Comparative Example 3 comprising a composite positive electrode plate 10F of Comparative Example 3 (not shown) prepared by laminating the same nickel positive electrode plates 11, 12 as in Example 1 in such an arrangement that the collector lead plates 11a, 12a welded thereto, respectively, were not opposed to each other, and a battery F of Comparative Example 4 comprising a composite positive electrode plate 10G of Comparative Example 4 (not shown) prepared by laminating the same nickel positive electrode plate 14 as in Example 2 and the nickel positive electrode plate 13 in such an arrangement that the collector lead plate welded to the nickel positive electrode plate 14 was not opposed to the nickel positive electrode plate 13 were additionally prepared. 1,000 samples were thus prepared for each of the batteries A and B of Examples 1 and 2, respectively, the modified battery C, the battery F of Comparative Example 3, and the battery G of Comparative Example 4. These batteries A, B, C, D, E, F and G were then each measured for internal resistance to determine the percent occurrence of short-circuiting. The results are set forth in Table 3 below.

TABLE 3

| Type of battery | A | B | C | F | G |
|---|---|---|---|---|---|
| % Occurrence of short-circuiting | 0 | 0 | 0 | 0.7 | 0.3 |

As can be seen in Table 3 above, the batteries A and B of Examples 1 and 2, respectively, and the modified battery C underwent no short-circuiting while the battery F of Comparative Example 3 underwent short-circuiting at a rate of 7 out 1,000 (0.7%) and the battery G of Comparative Example 4 underwent short-circuiting at a rate of 3 out 1,000 (0.3%). This is because the composite positive electrode plate 10G of the battery G of Comparative Example 4 comes in contact with one side of the separator only at the collector lead plate 14a, causing the separator to be pierced by burr developed during the preparation of the collector lead plate 14a and resulting in short-circuiting. On the other hand, since the composite positive electrode plate 10F of the battery F of Comparative Example 3 comes in contact with the separator at the collector lead plates 11a and 12a, burr developed during the preparation of the collector lead plates 11a and 12a pierces through the separator on one or both sides of the composite positive electrode plate 1OF, causing short-circuiting.

A thickness of the electrode plate core is preferably 0.5–3 mm, more preferably 1–2.5 mm. For example, in the case of using an expanded nickel as a electrode plate core, there are some problems when the thickness is too thick. In the case that the thickness is too thick, when active materials are filled up in to the expanded nickel to form an electrode plate and then the electrode plate is rolled uniform rolling cannot be performed. Further in the case that the thickness is made too thick on condition that weight per unit area is constant, a diameter of the electrode plate core becomes small and it is not able to keep a sufficient intensity or a distance between the electrode plate core and the active materials filled therein becomes longer and therefore reactivity is lowered. Contrary that, in the case that the thickness is made too thick without the condition that weight per unit area is constant, an weight of the electrode plate core is increased and it is impossible to obtain a light weight electrode plate.Since amount of pores is increased too much, active materials cannot be filled up to the pores uniformly.

Further with respect to the electrode plate core, it is required to define not only a thickness but also an weight per unit area. The weight per unit area of the electrode plate core is preferably to be 200 g/m$^2$–1000 g/m$^2$, more preferably 300 g/m$^2$–600 g/m$^2$. Namely the electrode plate core is required to have a sufficient thickness so as to contain a sufficient active material and to function as a collector electrode body.

A thickness of the separator is preferably 0.05–0.3 mm, more preferably 0.07–0.2 mm.

Further according a structure that the composite electrode plate is constituted by bonding the juxtaposed electrode plates through the collector lead plate sandwiched between one ends of the electrode plates and the bonded surfaces of the electrode plates are electrode plate core surfaces exposed of active material, and electrode plates are bonded by bonding the electrode plate core surfaces to the collector lead plate, it is able to use an electrode area at largest limit without increasing a thickness at large amount.

As above described, according to the present invention, it is able to obtain a required thickness of the electrode plate by defining a thickness of the electrode plate core and electrode plate at a best condition and using the electrode plate as a laminated body.

Therefore a rectangular battery such as a rectangular alkaline storage battery comprising an electrode plate which can be easily prepared and having a high packing density of active material and volumetric energy density, can be obtained.

As another embodiment, as shown in FIG. 5, a composite positive electrode plate can be interposed between the groups of the electrode plate through separators 30.

As another embodiment, as shown in FIG. 6, both of positive electrode and negative electrode can be constituted by composite electrode plates.

As mentioned above, in accordance with the arrangement of the group of electrode plates of the invention, the number of sheets of separators to be disposed in the group of electrode plates can be reduced, making it possible to increase the thickness of the electrode plates by the amount corresponding to the reduction in the number of sheets of separators and hence obtain a high capacity battery. Further, since as a means for increasing the thickness of the electrode plates there is used a composite electrode plate consisting of a plurality of electrode plates having a small thickness, the packing density of active material in the various electrode plates can be increased, making it possible to obtain a high energy density and capacity rectangular alkaline storage battery. The foregoing embodiments have been described with reference to the case where the present invention is applied to nickel-hydrogen storage batteries. However, the present invention is not limited to nickel-hydrogen storage batteries. The present invention can be applied also to other rectangular batteries such as nickel-cadmium storage battery, lithium ion secondary battery and etc. to obtain the same effects as mentioned above.

What is claimed is:

1. A rectangular battery comprising:
   a plurality of stacked electrode units, each electrode unit including a positive electrode, a negative electrode and a separator interposed therebetween, wherein at least one of the positive electrode and the negative electrode has a composite electrode plate made of a plurality of directly adjacent electrode plates of a same polarity and a collector lead plate sandwiched between the directly adjacent electrode plates of a same polarity, the collector lead plate being bonded to exposed active material of the directly adjacent electrode plates, wherein each of the electrode units is disposed directly adjacent another of the electrode units, wherein a core material of the composite electrode plate is made of expanded nickel, and wherein the other of the positive electrode and the negative electrode is made of punching metal;
   electrolyte solution; and
   a case accommodating said electrode units and said electrolyte solution therein.

2. The rectangular battery according to claim 1, wherein said rectangular battery is a rectangular alkaline storage battery.

3. The rectangular battery according to claim 1, wherein at least one collector lead plate is bonded to said composite electrode plate extending therefrom and said collector lead plate is disposed in such an arrangement that it doesn't come in contact with said separator at the bonded portion thereof.

4. The rectangular battery according to claim 1, wherein a collector lead plate is fixed between the electrode plates constituting said composite electrode plate and electric charge is collected from the electrode plates constituting said composite electrode plate through said collector lead plate.

5. The rectangular battery according to claim 1, wherein said one electrode plates are connected to each other through a connecting portion made of the core constituting said electrode plates and integrally formed with said electrode plates and said connecting portion is bent in almost U-shaped form so that said composite electrode plate is sandwiched by said one electrode plates connected to each other through said almost U-shaped connecting portion.

6. The rectangular battery according to claim 1, wherein at least anyone of said electrode plates comprises a core material comprising a metal porous material and an active material packed in said electrode plate.

7. The rectangular battery according to claim 1, wherein the composite electrode plate comprises a three-dimensionally continuous space packed with the active material slurry comprising nickel hydroxide as a main component.

8. The rectangular battery according to claim 1, wherein said composite electrode plate constitutes a positive electrode.

9. The rectangular battery according to claim 5, wherein said one electrode plate is made of a core metal coated with an active material paste.

10. The rectangular battery according to claim 5, wherein a plurality of the groups of electrode plates are laminated in closed-end prismatic rectangular metal can in such an arrangement that the one electrode at the both ends of the groups of electrode, the inner surface of the metal can came in close contact with each other, said U-shaped connecting portion is in close contact with the inner bottom surface of the metal can, the composite electrode is connected with at least one of the collector lead, and the metal can is filled with an electrolytic solution.

11. A rectangular battery comprising:
    a plurality of stacked electrode units, each electrode unit including a positive electrode, a negative electrode, and a separator interposed therebetween, wherein at least one of the positive electrode and the negative electrode has a composite electrode plate made of a plurality of overlayed electrode plates of a same polarity and a collector lead plate sandwiched between the overlayed electrode plates of a same polarity, the collector lead plate being bonded to exposed active material of the overlayed electrode plates, wherein each of the electrode units is disposed directly adjacent another of the electrode units, wherein a core material of the composite electrode plate is made of expanded nickel, and wherein the other of the positive electrode and the negative electrode is made of punching metal;
    electrolyte solution; and
    a case accommodating said electrode units and said electrolyte solution therein.

12. The rectangular battery according to claim 11, wherein the overlayed electrode plates are laminated.

* * * * *